United States Patent
Clift et al.

(10) Patent No.: US 11,108,848 B2
(45) Date of Patent: *Aug. 31, 2021

(54) METHODS AND SYSTEMS FOR USE IN PROVIDING A REMOTE USER INTERFACE

(71) Applicant: Saturn Licensing LLC, New York, NY (US)

(72) Inventors: Graham Clift, Poway, CA (US); Stephane Lejeune, San Diego, CA (US)

(73) Assignee: Saturn Licensing LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/874,512

(22) Filed: May 14, 2020

(65) Prior Publication Data

US 2020/0322422 A1     Oct. 8, 2020

Related U.S. Application Data

(63) Continuation of application No. 14/338,621, filed on Jul. 23, 2014, now abandoned, which is a
(Continued)

(51) Int. Cl.
*H04L 29/08* (2006.01)
*A63F 13/355* (2014.01)
(Continued)

(52) U.S. Cl.
CPC ............ *H04L 67/10* (2013.01); *A63F 13/355* (2014.09); *G06F 3/0481* (2013.01); *G06F 9/452* (2018.02);
(Continued)

(58) Field of Classification Search
CPC ................. G06T 15/005; A63F 13/355; A63F 2300/209; A63F 2300/538; H04L 67/10; G06F 9/452; G06F 3/0481
See application file for complete search history.

(56) References Cited

U.S. PATENT DOCUMENTS 6,125,387 A    9/2000   Simonoff
6,175,373 B1   1/2001   Johnson
(Continued)

OTHER PUBLICATIONS

USPTO; Advisory Action from U.S. Appl. No. 14/338,621 dated Dec. 20, 2016.
(Continued)

*Primary Examiner* — Oussama Roudani
(74) *Attorney, Agent, or Firm* — Fitch, Even, Tabin & Flannery LLP

(57) ABSTRACT

The present embodiments provide systems, methods and apparatuses for use in providing the playback of content. Some of these embodiments provide methods of playing back multimedia content, comprising: implementing, on a multimedia rendering client device coupled with a LAN, a simplified Internet browser that establishes a browser environment; establishing a network connection over the LAN between the client device and a remote server; operating, within the browser environment, a lightweight remote user interface (RUI) protocol client application that is operated with a JavaScript based graphics application program interface to a graphics protocol stack of the client device; receiving graphics commands; implementing, through the RUI protocol client application in cooperation with the JavaScript based graphics application program interface, the graphics commands and generating graphics in accordance with the graphics commands; and displaying on the client device the graphics consistent with the graphics commands.

20 Claims, 6 Drawing Sheets

Related U.S. Application Data continuation of application No. 13/150,477, filed on Jun. 1, 2011, now Pat. No. 8,799,357.

(60) Provisional application No. 61/411,132, filed on Nov. 8, 2010.

(51) Int. Cl.
*G06F 9/451* (2018.01)
*G06T 15/00* (2011.01)
*G06F 3/0481* (2013.01)

(52) U.S. Cl.
CPC ...... *G06T 15/005* (2013.01); *A63F 2300/209* (2013.01); *A63F 2300/538* (2013.01)

(56) References Cited

U.S. PATENT DOCUMENTS

| | | |
|---|---|---|
| 6,745,386 B1 | 6/2004 | Yellin |
| 6,842,777 B1 | 1/2005 | Tuli |
| 6,907,546 B1 | 6/2005 | Haswell |
| 7,430,681 B1 | 9/2008 | Hobbs |
| 7,667,704 B2 | 2/2010 | Hogle |
| 7,793,232 B2 | 9/2010 | Chaudhri |
| 7,822,278 B1 | 10/2010 | Hobbs |
| 7,844,442 B2 | 11/2010 | Tzruya |
| 8,799,357 B2 | 8/2014 | Clift |
| 9,208,174 B1 | 12/2015 | Ballagh |
| 2002/0087630 A1 | 7/2002 | Wu |
| 2003/0056030 A1 | 3/2003 | Gao |
| 2003/0163546 A1 | 8/2003 | Cheng |
| 2004/0046778 A1 | 3/2004 | Niranjan |
| 2005/0143654 A1 | 6/2005 | Zuiderveld |
| 2006/0227141 A1 | 10/2006 | Hogle |
| 2007/0005727 A1 | 1/2007 | Edwards |
| 2007/0028260 A1 | 2/2007 | Williams |
| 2007/0043550 A1 | 2/2007 | Tzruya |
| 2009/0019151 A1 | 1/2009 | Stavrakos |
| 2010/0077058 A1 | 3/2010 | Messer |
| 2010/0083337 A1 | 4/2010 | Williams |
| 2010/0223322 A1* | 9/2010 | Mott ............... H04L 67/34 709/203 |
| 2010/0281107 A1 | 11/2010 | Fallows |
| 2010/0332984 A1 | 12/2010 | Tzruya |
| 2011/0004916 A1 | 1/2011 | Schiffman |
| 2011/0066933 A1 | 3/2011 | Ludwig |
| 2011/0093525 A1 | 4/2011 | Han |
| 2011/0161409 A1 | 6/2011 | Nair |
| 2011/0282995 A1 | 11/2011 | Gass |
| 2011/0289419 A1* | 11/2011 | Yu ............... H04N 21/485 715/738 |
| 2011/0294490 A1* | 12/2011 | Faenger ............... G08C 17/00 455/419 |
| 2012/0079374 A1* | 3/2012 | Gaddis ............... G06F 16/9577 715/269 |

OTHER PUBLICATIONS

USPTO; Clift et al; U.S. Appl. No. 14/338,621, filed Jul. 23, 2014.
USPTO; Clift et al.; U.S. Appl. No. 13/150,477, filed Jun. 1, 2011.
USPTO; Examiner Interview Summary from U.S. Appl. No. 13/150,477; dated Mar. 17, 2014; 2 pgs.
USPTO; Final Office Action from U.S. Appl. No. 14/338,621 dated Oct. 10, 2019.
USPTO; Non-final office action from U.S. Appl. No. 13/150,477; dated Oct. 10, 2013; 18 pgs.
USPTO; Non-final office action from U.S. Appl. No. 14/338,621 dated May 19, 2016.
USPTO; Non-Final Office Action from U.S. Appl. No. 14/338,621 dated Oct. 3, 2017.
USPTO; Non-Final Office Action from U.S. Appl. No. 14/338,621 dated Sep. 26, 2018.
USPTO; Non-Final Office Action issued in U.S. Appl. No. 14/338,621 dated Apr. 5, 2019.
USPTO; Notice of Allowance from U.S. Appl. No. 13/150,477; dated Mar. 28, 2014; 15 pgs.
USPTO; Notice of Allowance from U.S. Appl. No. 14/338,621 dated Feb. 18, 2020.
USPTO; Restriction Requirement from U.S. Appl. No. 13/150,477; dated Jun. 19, 2013; 5 pgs.
Wikipedia; "Canvas Element"; Date Updated Jul. 23, 2014, 5 pgs; http://en.wikipedia.org/wiki/Canvas_element.
Wikipedia; "JSON"; Date Updated Aug. 26, 2014; 15 pgs; http://en.wikipedia.org/wiki/JSON.
Wikipedia; "Lightweight Java Game Library"; Date Updated Apr. 5, 2014; 2 pgs; http://en.wikipedia.org/wiki/LWJGL.
Wikipedia; "OpenGL ES"; Date Updated Aug. 27, 2014; 8 pgs; http://en.wikipedia.org/wiki/OpenGL_ES.
Wikipedia; "OpenGL"; Date Updated Aug. 22, 2014; 18 pgs; http://en.wikipedia.org/wiki/Open_GL.
Wikipedia; "WebGL"; Date Updated Aug. 27, 2014, 6 pgs; http://en.wikipedia.org/wiki/WebGL.
Wikipedia; "Websockets"; Date Updated Aug. 22, 2014; 6 pgs; http://en.wikipedia.org/wiki/Websockets.

\* cited by examiner

METHODS AND SYSTEMS FOR USE IN PROVIDING A REMOTE USER INTERFACE

This application is a continuation of U.S. application Ser. No. 14/338,621, filed Jul. 23, 2014, for Clift et al., entitled METHODS AND SYSTEMS FOR USE IN PROVIDING A REMOTE USER INTERFACE, which is a continuation of U.S. application Ser. No. 13/150,477, filed Jun. 1, 2011, now U.S. Pat. No. 8,799,357, for Clift et al., entitled METHODS AND SYSTEMS FOR USE IN PROVIDING A REMOTE USER INTERFACE, which claims the benefit of U.S. Provisional Application No. 61/411,132, filed Nov. 8, 2010, for Clift et al., which are incorporated in their entirety herein by reference.

BACKGROUND

1. Field of the Invention

The present invention relates generally to the playback of content, and more specifically to visual graphics content.

2. Discussion of the Related Art

The number of consumer electronic devices available to display visual graphics content continues to grow. These devices provide users with the ability to view a wide range of content.

The distribution of information and content has similarly continued to increase. The use of the Internet to distribute content has made content readily available to users using different kinds of devices.

SUMMARY OF THE INVENTION

Several embodiments of the invention advantageously provide systems, methods and apparatuses for use in providing the playback of content. Some of these embodiments provide methods of playing back multimedia content, comprising: implementing, on a multimedia rendering client device coupled with a distributed local area network (LAN), a simplified Internet browser, where the browser establishes a browser environment; establishing a network connection over the distributed LAN between the client device and a remote server on the LAN; operating, within the browser environment and on the client device, a lightweight remote user interface (RUI) protocol client application that is operated with a JavaScript based graphics application program interface to a graphics protocol stack of the client device; receiving, through the RUI protocol client application and from the server over the LAN, graphics commands; implementing, through the RUI protocol client application in cooperation with the JavaScript based graphics application program interface, the graphics commands and generating graphics in accordance with the graphics commands; and displaying on the client device the graphics consistent with the graphics commands.

Other embodiments provide methods of controlling playback of graphics content. Some of these method comprise: establishing, through a server, a bidirectional persistent Transmission Control Protocol (TCP) network connection over a distributed local area network (LAN) between the server and a remote client device coupled with the LAN; initiating local processing of multimedia content at the server, where the initiating the local processing comprises generating graphics commands intended to be utilized locally at the server to generate graphics intended to be locally displayed; implementing a protocol adaptor inserted within a protocol stack of the server at a graphics driver level of the protocol stack; intercepting, within the protocol adaptor, the graphics commands; and communicating the intercepted graphics commands over the persistent network connection to the client device on the LAN.

Additionally, other embodiments provide computer program products comprising a medium for embodying a computer program for input to a processor based system and a computer program embodied in the medium for causing the processor based system to perform steps comprising: implementing, on a multimedia rendering client device coupled with a distributed local area network (LAN), a simplified Internet browser, where the browser establishes a browser environment; establishing a persistent network connection over the distributed LAN between the client device and a remote server on the LAN; operating, within the browser environment and on the client device, a lightweight remote user interface (RUI) protocol client application that is operated with a JavaScript based graphics application program interface to a graphics protocol stack of the client device; receiving, through the RUI protocol client application and from the server over the LAN, graphics commands; implementing, through the RUI protocol client application in cooperation with the JavaScript based graphics application program interface, the graphics commands and generating graphics in accordance with the graphics commands; and displaying on the client device the graphics consistent with the graphics commands.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
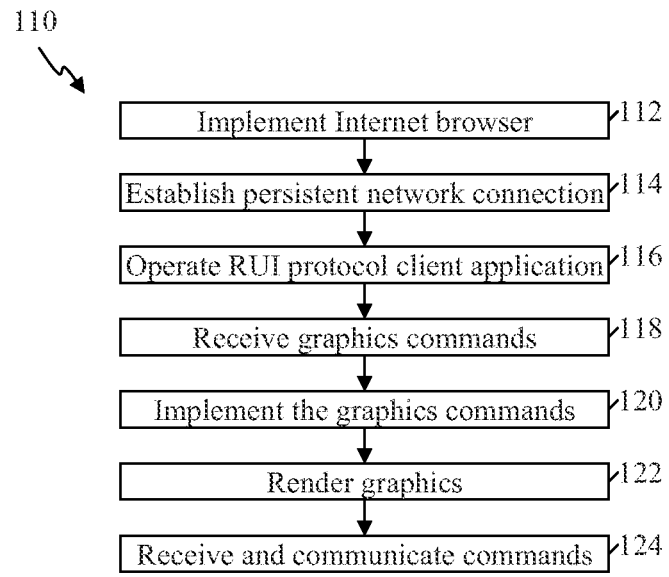
FIG. 1 depicts a simplified flow diagram of a process of implementing a remote user interface (RUI) on a client device according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations," or similar language means that a particular feature, structure, or characteristic described in connection with the embodiment is included in at least one embodiment of the present invention. Thus, appearances of the phrases "in some embodiment," "in some implementations," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Some embodiments of the present invention are directed to methods, systems and apparatuses for use in providing a remote user interface (RUI) and/or the distribution of content to and display of graphics content through a RUI. Further, some embodiments provide RUI methods configured to stream visual and/or audio data, including graphics commands and data to a RUI protocol client application running within an Internet web browser environment that is used by the RUI client device to generate and display visual graphic content. By implementing a protocol the RUI client application may be lightweight in terms of total memory usage in comparison to an RUI client application configured to perform similar functionality as a local client application. In some instances the streaming of the graphics commands is provided in real time, such as but not limited to displaying the progress of an interactive electronic game as the game progresses. Additionally, some embodiments take advantage of existing technologies in processing, communicating and/or controlling the display of graphics commands through the RUI at a remote client device.

In accordance with some embodiments an RUI client application can be operated on an RUI client that is a stripped down web browser that occupies less memory and reduces the CPU processing needs of the web browser versus other typical web browsers. As such, client devices that have good graphics capabilities but limited CPU processing capabilities, limited memory and/or limited functionalities can still be utilized in operating as remote user interface by employing the lightweight RUI client within a browser environment. For example, a networked television can take advantage of the lightweight RUI client application to display graphics generated on a remote server even though the television may have limited capabilities and/or memory but sufficient graphics processing.

Additionally, some embodiments format data and/or graphics commands and serve this data and/or graphics commands over a distributed network, such as a Local Area Network (LAN), to an RUI client protocol application operating through a browser on a client device. For example, graphics from a graphical user interface or of an interactive electronic video game being implemented at a server device can be formatted according to a wired protocol of a graphics language application, such as WebGL™, and communicated to a browser client on a remote client device to be displayed at the client device. Further, in some instances performance is enhanced through the use of a persistent network connection between a server or other device communicating the graphics commands and the client device. For example, some embodiments establish a bidirectional persistent Transmission Control Protocol (TCP) network connection over the distributed LAN between a server and a client device on the LAN.

A graphics protocol layer can be modified in a client consumer entertainment multimedia device that has a limited capability of holding and operating an application, such as a television, to provide a remote user interface on the client device. In some embodiments, the lightweight RUI protocol client application can be incorporated within the graphics stack of the client device and operated within a browser environment to provide an interface between the streamed content and WebGL™ (Web-based Graphics Library).

Further, a protocol server client can be incorporated with the graphics stack of a server device that configures the graphics commands and/or data based on JavaScript such that the graphics information is compatible with an Internet browser. The protocol server client can be incorporated at a low level within the graphics protocol, and in some instances at the graphics driver level such that graphics information is intercepted, formatted when relevant and communicated to the client device.

Some prior systems provided the capability to perform processing at a server device and display graphics at a remote display. For example, X Windows system provided a basis for graphical user interfaces (GUI) for networked computers. It is noted, however, that graphics within such X Windows systems are generally not compatible with nor rendered through an Internet browser or browser environment. In the consumer electronics (CE) domain, the utilization of RUI approaches has had little traction, with the limited exceptions of RUIs based on Hyper Text Markup Language (HTML) browsers, which generally do not present a pixel accurate or fast real time rendering without the use of non-standard plug-ins, and are used for the delivery of a UI of services from the Internet. Alternatively, the present embodiments provide an RUI approach that enables the real time distribution of graphics commands or data to be displayed at a remote client within a browser environment.

FIG. 1 depicts a simplified flow diagram of a process 110 of implementing a remote user interface (RUI) on a client device according to some embodiments. In step 112, an Internet web browser is implemented on the client devices. In many applications this Internet browser is a simplified and stripped down browser that can be implemented on a client device with limited memory and/or processing capabilities. For example, a stripped down browser might implement only HTTP for network connectivity and JavaScript engines with relevant application program interfaces for graphics rendering and event handling, and in some instances with limited or no support for the HTML and CSS rendering typical in a full browser. Such a simplified browser would typically utilize a fraction of the memory compared to typical browsers operated on desktop and laptop computers as well as embedded and/or portable devices, Such a simplified browser might expect to see a 90% reduction in memory usage on the client as well as a significant improvement in graphics performance through a carefully optimized implementation.

As described above, the client device is coupled with a distributed network, such as a LAN, and can communicate with a server also on the LAN. Accordingly, in step 114 a connection is established between the client device and the server. In some implementations the connection is a persistent full-duplex communications channel over a single Transmission Control Protocol (TCP) socket. For example, some embodiments establish a WebSocket connection utilizing a WebSocket API (Application Program Interface) and protocol, such as the WebSocket API being standardized by the W3C (World Wide Web Consortium) and protocol being standardized by the Internet Engineering Task Force (IETF). The persistent full-duplex communication channel in part enhances performance and reduces latency of bi-directional interactions between the server and the client.

In step 116, an RUI protocol client application (referred to below as an RUI client) is implemented at the client device within the browser environment established by the web browser or stripped down browser. In some implementations, the RUI client application is received from the server over the LAN and executed on the client device through the browser. In some instances the RUI client application resides already on the client device, such as received from a previous session with the server. In step 118, graphics information, and in some instances audio or other data, is received from the server through the persistent WebSocket connection. Typically, the server streams the graphics information to the client device to be used by the RUI client in generating and displaying graphics at the client device.

In step 120, the graphics commands are implemented through the RUI client utilizing the graphics capabilities of the browser environment and/or the client device. In some embodiments, the RUI client is implemented within the graphics protocol stack on top of an API that provides access to graphics libraries. For example, in some embodiments the RUI client implements the graphics protocol stack of the client device as a JavaScript based graphics application program interface, such as WebGL™, that provides direct access to accelerated graphics capabilities, and in some instances extends the capabilities of JavaScript programming language to allow it to generate interactive three-dimensional (3D) graphics within the browser environment. Further, the RUI client may further take advantage of the capabilities of WebGL and the use of canvas HTML elements in providing a 3D graphics API without the use of plug-ins. Additionally, in some implementations, the WebGL provides access to the 3D context of canvas elements and compatibility with OpenGL ES 2.0 driver interfaces, which can create a low level accelerated 3D graphics environment at the JavaScript application level.

In step 122 the graphics information, data and/or graphics generated from the graphics commands are rendered on the client device. The rendering, in some instances, can be enhanced or optimized by managing buffering, controlling when graphics are displayed, controlling the refreshing of the display screen of the client device and/or other such management as described below. In some embodiments, the process 110 may further include optional step 124 in identifying commands relative to the control of playback of the multimedia content at the server and communicating those commands back to the server. For example, the graphics being displayed through the RUI client at the client device may be the graphics of an interactive electronic video game. In some implementations, a user at the client device may optionally input commands at the client device that can affect playback of the video game (e.g., moving a displayed character or avatar forward, backwards, left or right; causing a character or avatar to jump to take other action; activating weapon; pausing playback; displaying options; selecting from available options; and/or other such actions or combinations of such actions). Accordingly, the RUI client can forward those commands, in step 124, to the RUI protocol client application though a JavaScript application program interface for event handling and then back to the server as protocol formatted input commands whereupon the server decodes these commands in order to take appropriate action in controlling the playback of the video game. Further, the commands are typically communicated over the persistent connection to reduce latency.

The graphics information is received at the client device over the persistent connection from the server. The server, in preparing to communicate the graphics commands and/or data, typically processes and/or formats the graphics information so that the graphics can be displayed through the RUI client within the browser environment.

Figure 2:
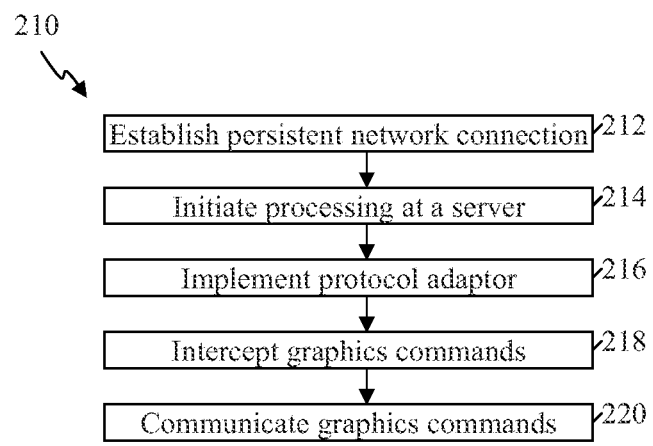
FIG. 2 depicts a simplified flow diagram of a process implemented at a server in processing and communicating graphics information to the RUI client so that the graphics can be displayed at the client device.

FIG. 2 depicts a simplified flow diagram of a process 210 implemented at a server in processing and communicating graphics information to the RUI client so that graphics can be displayed at the client device. In step 212, a connection is established between the client device and the server. Again, the connection is typically established as a persistent full-duplex communications channel over a single Transmission Control Protocol (TCP) socket. For example, some embodiments establish a WebSocket connection utilizing a WebSockets API and protocol.

In step 214, the server processes the multimedia content and generates graphics commands, data and the like in accordance with the multimedia content, and typically for rendering of the multimedia content. The multimedia content can include substantially any graphically displayable content, such as but not limited to an interactive video game, video content and other such relevant content. Further, the server in some instances can generate audio content. The processing of the multimedia content can include identifying graphics commands, initiating playback of the multimedia content and identifying graphics commands from the playback, decoding multimedia content and identifying graphics commands and/or other such processing or combinations of such processing. In some embodiments, the server may have a local display such that the content is processed with the intent that the graphics commands are to be used in generating graphics to be locally displayed at the server. In other instances, however, the server may not intend that content be displayed at the server, and instead the server processes the multimedia content and/or graphics commands with the intent that the content is to be distributed to the client device.

In step 216, a server protocol adaptor or application is incorporated into and activated within the graphics protocol stack of the server. In some embodiments, the server protocol adaptor is incorporated at a graphics driver level of the graphics protocol stack of the server. In step 218, the server protocol adaptor intercepts graphics information and appropriately formats and/or converts at least graphics commands and/or data to be communicated to the RUI client. In some instances, the graphics commands and/or data are formatted and/or converted prior to being communicated to the client device. In step 220, the graphics commands and/or data, and in some instances other data such as audio data, is communicated over the established persistent connection to the RUI client.

Again, the server in some embodiments can be configured with a display such that the server is configured to process the graphics information within the graphics protocol stack of the server with the intent that the graphics be displayed by the server. The server protocol adaptor can intercept the graphics information, process and/or format the graphics commands and/or data and cause the graphics information to be communicated over the persistent connection. The interception of the graphics information may not prevent the server from displaying the graphics content in addition to communicating the graphics to the RUI client to be displayed at the client device. For example, when the server is a computing device (e.g., a laptop, computer, an iPad™, or other such device), the computing device may display the graphics content in addition to the graphics content being communicated to and displayed by the client device.

Some embodiments in processing, communicating and/or controlling the rendering of graphics through the RUI client at the client device take advantage of HTML5, web browser compatible graphics, WebGL, WebSockets and other technologies. Further, the RUI client, in some respects, resembles an X Window system. The RUI client, however, differs from the X Windows system in part because it is operated within a browser environment, typically using some standard browser technologies. Further, the RUI client can operate on a client device that has limited capabilities and/or memory to hold and/or operate typical applications that may provide some graphics generation through a browser environment. The RUI client can be delivered to a client device to provide a playback experience on the client device comparable to an Internet experience while still being lightweight and operating on a client device with limited capabilities and/or memory, such as a TV.

The RUI client is configured to receive the graphics information on a remote display capable client device and cause graphics to be utilized to generate graphics to be displayed at the client device. In some embodiments, the RUI client can further respond to user input at the client device. As introduced above, the utilization of RUIs with CE devices has had little traction, with the limited exceptions of RUIs based on HTML browsers that generally do not present a pixel accurate or fast real time rendering without the use of non-standard plug-ins. Some present embodiments, utilize the features and/or capabilities provided through HTML5 in delivering highly graphical and interactive user experiences through the use of declarative (XML) graphical methods (e.g., SVG), and procedural (e.g., JavaScript) graphical methods utilizing canvas and/or image elements like Canvas2D and WebGL. The utilization of WebGL in part can allow an accelerated 3D rendered, OpenGL ES compatible, application to be presented directly in a browser environment using JavaScript API calls.

As described above, some embodiments establish a persistent connection between the server and the client device and/or RUI client at the client device. In some implementations, WebSockets JavaScript API technology can be used to aid in establishing this connection. WebSockets can allow JavaScript applications to communicate bidirectionally with the server over a connection or channel, such as a single TCP/IP socket capable of transparently traversing proxies. By utilizing the combination of this communication technology with the support for advanced procedural graphics, and in some embodiments, the utilization of real time or substantially real time compilers (e.g., native or just-in-time (JIT) JavaScript real-time compilers), some embodiments provide a lightweight RUI client that can operate within a browser environment (e.g., an HTML5 capable browser environment) on a client device having limited resources, memory and/or processing capabilities.

Generally, HTML browsers employ a simple mark-up language interpreter that creates a Document Object Model (DOM) for a renderer to assemble and display a small number of diverse elements like text, images and graphics. Dynamic HTML typically allows documents to be updated by user events and in some implementations uses script elements for embedding JavaScript functions and event handling. Effective multimedia support, however, generally remained in the domain of additional applications and/or browser plug-ins like Adobe Flash™, where scripting environments may provide raster and vector graphics to create visual effects and video control.

Some browsers have added support for pixel animation, for example, through GIF images and graphics for Scalar Vector Graphics (SVG). Generally, however, compared to Flash™ for instance, SVG often utilizes heavy amounts of resources and rendering performance may be especially poor, such as when the object count gets large. The use of elements, such as canvas and image elements with HTML5, addresses some of the prior shortcomings of standard browsers. Canvas elements provide pixel based graphics areas that, through JavaScript bindings, can be used for manipulating images ("blitting") and performing vector graphics operations.

Again, some embodiments utilize a graphics language API in utilizing the capabilities of the JavaScript programming language to generate interactive 3D graphics within any compatible web browser. For example, some embodiments take advantage of WebGL. WebGL, generally, is a JavaScript API that provides direct access to the 3D context of a canvas element, and in some instances may provide near one-for-one compatibility with OpenGL ES2.0 driver interfaces. This creates a very low level accelerated 3D graphics environment right at the JavaScript application level. Additionally, the use of vector graphics allows graphics to be accurately scaled for substantially any sized display screen and rendered with little if any loss in quality. Buffers, textures and other WebGL objects may be stored in the DOM to provide memory allocation, and in some instances force allocation (e.g., permanent allocation) of memory space to data, which may in some implementations overcome JavaScript garbage collection and deletion issues.

Further, at least one difference between OpenGL ES and WebGL was identified in how a display is actually refreshed. With OpenGL ES the management of the window generally utilizes mechanisms triggered by a call to "flip" that pulls the newly rendered back buffer to a foreground. In contrast, with WebGL the drawing is typically done to a buffer that gets presented to the HTML compositor for display upon receipt of one of multiple commands, such as commands to flush, finish, draw or clear. Generally, WebGL does not have an explicit flip call.

Additionally, latencies in the communication of the graphics information was identified and addressed through the implementation of the persistent connections over the distributed network, which in part enhances the interactivity available through the RUI client. Some embodiments employ HTML5 WebSockets, which provide an API made available to JavaScript that keeps a connection alive in the background while offering up an event driven connection, such as an event driven TCP/IP connection, to the application layer. For example, the WebSocket protocol, in some instances, uses HTTP CONNECT methods to set up a persistent tunnel when a proxy is detected, which can allow for LAN, and in some instances WAN, applications to share more commonality at the connectivity level. The WebSockets protocol generally supports text (UTF-8) based frame exchange, which in some instances may be inefficient from a network bandwidth perspective.

Some embodiments format content in accordance with a text based formatting. For example, some embodiments utilize JavaScript Object Notation (JSON) formatting and JSON formatted remote procedure calls, which can be especially suited in leveraging the text based frame exchange supported WebSockets protocol. Additionally, some embodiments typically employ highly accelerated JavaScript with the use of improved compilation. For example, some embodiments utilize look ahead compilation (e.g., Just-In-Time (JIT) compilation) and/or fully pre-compiled (e.g., native, static, ahead-of-time, etc.) JavaScript execution environments.

Accordingly, some embodiments process graphics information to generate graphics commands, formats these graphics commands and communicates the formatted commands over a low latency persistent connection to a RUI client. Further, a lightweight, small RUI client at the client device can be utilized that sits on top of WebGL, inside a stripped down, simplified browser application that supports HTML5, and uses a persistent connection with a server to render accelerated graphics on a remote client device within the browser environment. As such, some embodiments emulate an X Windows System but using browser technologies to implement the RUI client application within the browser environment and utilizing JavaScript as an interface to accelerated 3D graphics in delivering graphics commands and displaying graphics on the remote client.

Figure 3:
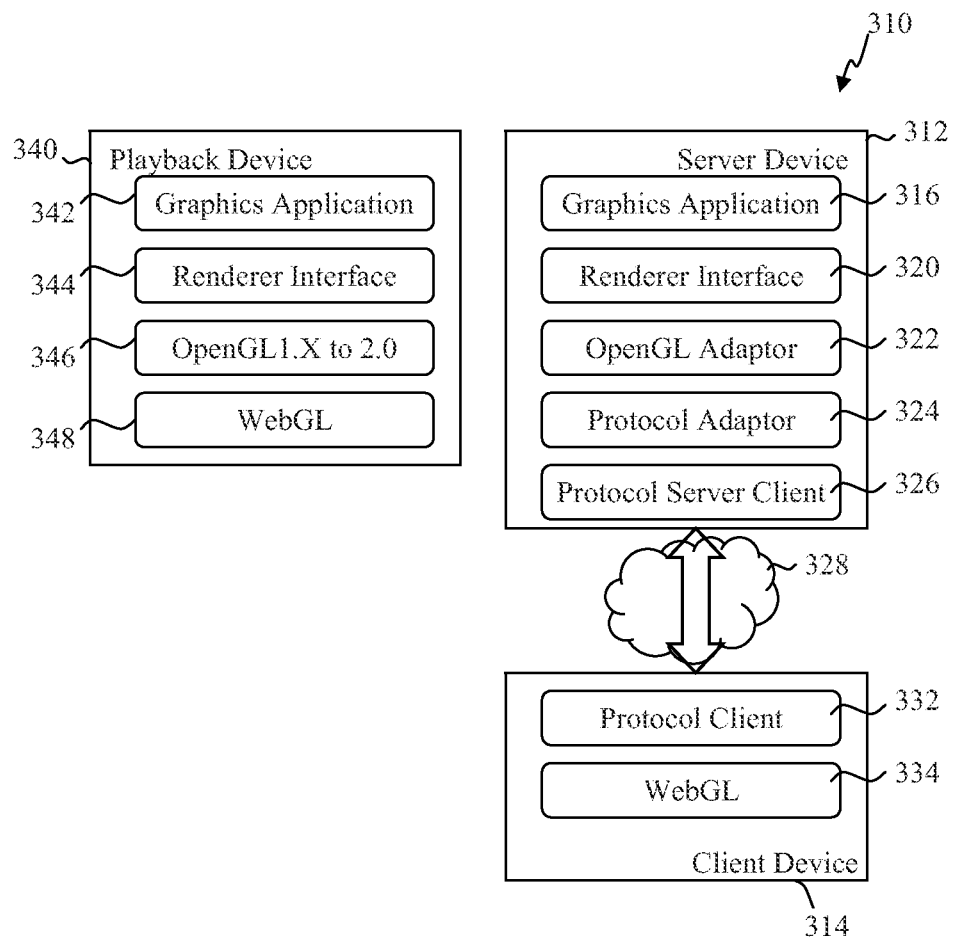
FIG. 3 depicts a simplified block diagram representation of a graphics protocol stack according to some embodiments.

FIG. 3 depicts a simplified block diagram representation of a graphics protocol stack 310 according to some embodiments. The protocol stack 310 is further shown in relation to a playback device protocol stack 340 utilized in a playback device that internally implements a graphics application, processes graphics and directly displays content at the playback device, such as provided through a local playback device application (e.g., GWTQuake as further described below), and does not receive the graphics or graphics commands from a remote source. The protocol stack 310 includes a server graphics protocol stack 312 that cooperates with a client graphics protocol stack 314 implemented at a remote client device. The server graphics protocol stack 312 further includes a graphics application 316 that generates the graphics commands (e.g., a video game, video content, or the like), a renderer interface 320, an OpenGL adaptor 322, a protocol adaptor application 324 and a protocol server client 326. The client graphics protocol stack 314 includes a RUI protocol client application 332 (referred to as the RUI client) and a graphics library API, such as WebGL 334.

In this example, the graphics protocol stack 310 is described below in reference to an interactive video game graphics application 316 that when implemented generates graphics commands that are processed within the graphics protocol stack 310 and communicated to the client device and rendered through the client graphics protocol stack 314 of the client device. Similarly, in this example, the playback device protocol stack 340 is an example stack in accordance with a Java video game ported to JavaScript using Google Web Toolkit™ (GWT) where the graphics are played back at the playback device and not communicated to a RUI. Additionally, the video game in this example was a first person shooter computer game entitled QuakeII, which provides open source ports in both Java (called JakeII or Jake2) and HTML5 JavaScript (called quake2-gwt-port, which is referred to below as GWTQuake). The GWTQuake was built from Jake2 using GWT, where an Eclipse IDE plug-in translates Java code into JavaScript. Google™ extended GWT to include library support for the HTML5 Canvas 2D and WebGL APIs and provided an implementation of the Java New Input/Output (NIO) buffers using WebGL structured typed arrays. The GWTQuake JavaScript port is useful as a comparison because of the JavaScript language; however, the entire graphics application 342 and playback device protocol stack 340 (e.g., entire video game) is stored and operated at the playback device.

In continuing this example, the graphics application 316 of the server graphics protocol stack 312 can be the Jake2 video game. Accordingly, the graphics application is implemented at the server and not the client device. The renderer interface 320 provides an extension to the OpenGL using, for example, Java OpenGL (JOGL) and/or a LightWeight Java Game Library (LWJGL) driver. The OpenGL adaptor 322 is provided when the graphics application 316 is based on OpenGL 1.x. For example, the OpenGL adaptor 322 interface layer adapts the OpenGL 1.5 based LWJGL API to an OpenGL ES 2.0 based WebGL API.

An additional protocol adaptor 324 is included in some embodiments to provide format conversion and/or formatting of the graphics commands and/or data. In some implementations the protocol adaptor 324 formats the graphics commands according to a text base formatted protocol based on WebGL. For example, in some embodiments, the protocol adaptor 324 formats the function calls or graphics commands from a JavaScript format to a text based format, such as converting from a JavaScript format to a text based JavaScript Object Notation (JSON). Some embodiments further format the graphics commands for streaming over the network. The protocol adaptor 324, in some embodiments, is implemented at a graphics driver level of the server, and identifies graphics commands and/or data to be communicated to the client device.

The protocol server client 326, in part, establishes a persistent communication connection across a distributed network 328 with the client device, such as a WebSocket connection (e.g., implementing an HTML5 WebSocket available from Mortbay Jetty, and particularly, Jetty 7.1.1.v20100517 or later library). Some embodiments may employ alternative networking connections, such as binary WebSocket and/or such persistent connections that may, in part, reduce processing and/or CPU loads and improve frame rates. Further, the protocol server client 326 in some implementations can maintain and/or control buffering at the server. Some embodiments additionally allow for a size of the buffer to be set and/or altered, for example in code and/or via a command line argument. Adjusting the buffer size up or down can tune the performance for the particular application, server and/or client device, which often can be based on typical or expected message sizes, use of immediate calls and other such factors. In some instances, the control attempts to maintain buffer levels. For example, a request to send an immediate message can result in the buffered information being sent, followed by the immediate message, while other messages are queued until the buffer has reached desired levels and/or is filled before being sent. The buffering can further be configured, in some embodiments to allow some messages to break across buffer sends. Additionally or alternatively, some embodiments do not wait for a Finish call to complete before continuing to buffer data on the server and/or the client device for a subsequent frame. This can include reorganizing one or more frame sequences, in particular the scanning for keyboard, mouse and/or other user or application events.

The client graphics protocol stack 314 of the client device includes the RUI client 332, which is typically implemented within a browser environment established by a simplified and stripped down web browser (not shown in FIG. 3). The RUI client 332 operates on top of and/or cooperates with a JavaScript interface, such as the WebGL 334 at the client device in implementing the graphics commands and rendering graphics consistent with the graphics commands. Further the RUI client 332 cooperates with the protocol server client 326 in establishing and maintaining the persistent connection. In some embodiments, the RUI client 332 implements an HTML5 WebSocket (e.g., a GWT HTML5 native JavaScript WebSocket). The RUI client 332, in some implementations, can be written in JavaScript and can be communicated over the distributed network to the client device.

Figure 4:
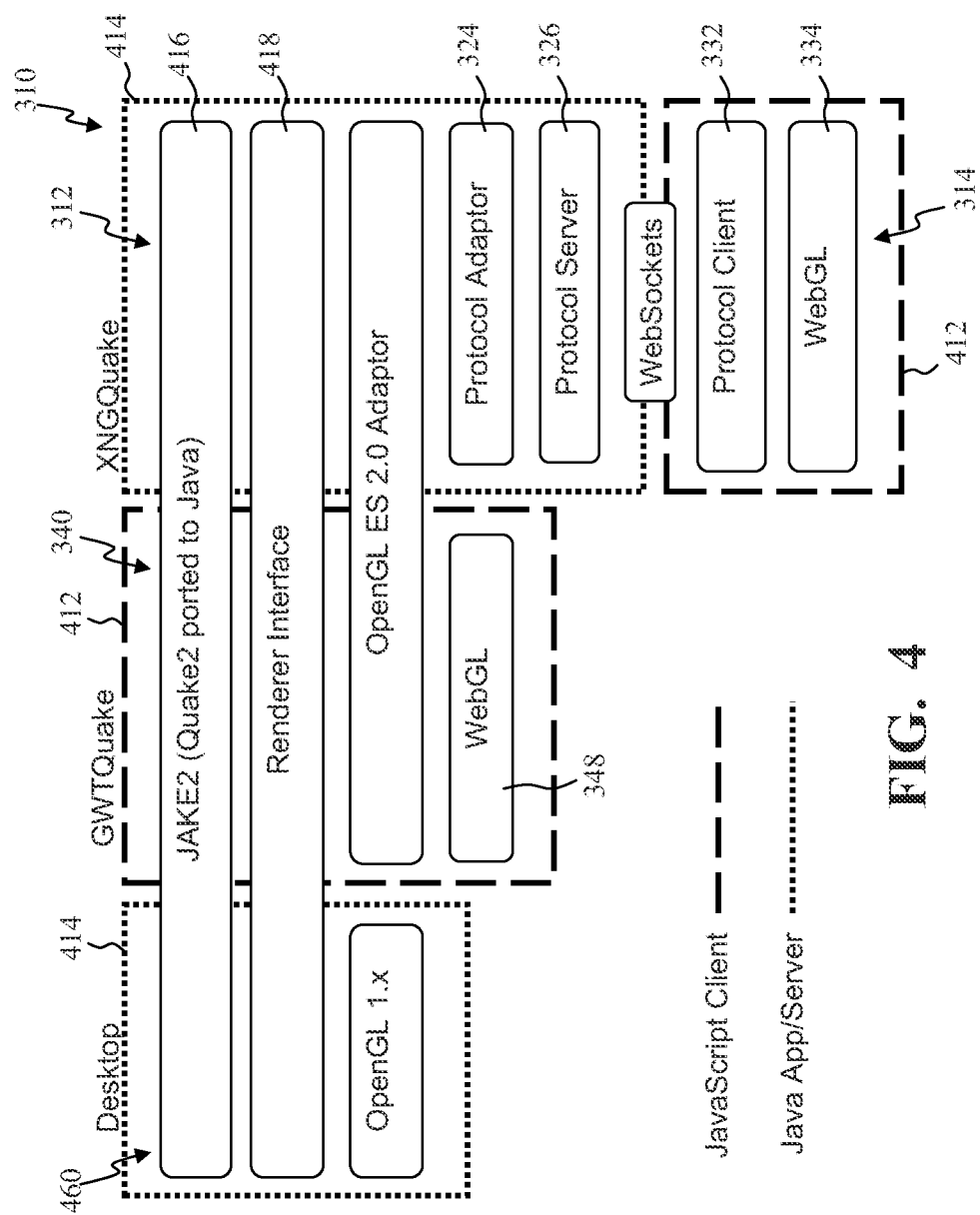
FIG. 4 depicts a simplified block diagram representation of the graphics protocol stack, according to some embodiments, in relation to the playback device protocol stack for a local client device application and a desktop protocol stack.

FIG. 4 depicts a simplified block diagram representation of the graphics protocol stack 310, according to some embodiments, in relation to the playback device protocol stack 340 for GWTQuake as well as a desktop protocol stack 460 (e.g., a protocol stack of a computer locally implementing the Quake 2 application). Additionally, FIG. 4 distinguishes between JavaScript 412 client or playback device stacks and Java 414 application and/or server implemented stacks according to some embodiments. To simplify the depiction of the relationship, FIG. 4 is further shows with the graphics application 416 and renderer interface 418 extending across each of the server graphics protocol stack 312, the playback device protocol stack 340, and the desktop protocol stack 460, while it will be apparent to those skilled in the art that the same graphics application 416 and renderer interface 418 are not actually be utilized in the differing stacks.

The desktop protocol stack 460 is implemented according to Java, while the GWTQuake playback device protocol stack 340 is implemented in JavaScript. Alternatively, the server graphics protocol stack 312 according to some embodiments is implemented through Java, while the client graphics protocol stack 314 in some embodiments is implemented through JavaScript. Accordingly, different processing is implemented through the differing stacks, while further formatting and/or configuring of graphics commands and/or information may be implemented for the conversion from Java to JavaScript and/or to distribute the graphics commands and/or information to the RUI client and client device.

As described above, the RUI client 332 is typically a lightweight application that utilizes a relatively small amount of memory at the client device, in part, because the graphics processing occurs at the server device. In some instances, the memory used by the code and data for the RUI client 332 is less than half that used by a corresponding GWTQuake, less than a third in some instances, and in some implementations one fifth or less the memory used by a corresponding GWTQuake. The RUI client application receives the text based formatted content, which in some instances is streamed over the persistent connection. The RUI client 332 further processes and/or translates the received communications from a streaming format to a JavaScript and/or WebGL compatible format.

Further optimization was provided in some embodiments to improve performance, reduce memory and/or processor overhead, and achieve other advantages. For example, some embodiments use synchronicity of WebGL API graphics commands. Most WebGL commands do not need a response or synchronization between client and server. Typically, a JSON RPC (remote procedure call protocol) defines a protocol for sending a command and waiting for a response, which could be very slow for some applications (e.g., a WebGL interactive video game). Accordingly, some embodiments format non-synchronous or asynchronous commands with no response expected, which can reduce latency and/or provide minimal latency.

Additionally or alternatively, some embodiments in formatting the graphics information reduce network bandwidth and processing in part by reducing object and/or named keys for data entry in commands. Generally, JSON RPC approaches rely on text based named keys for each data entry in the command. Some present embodiments use one key (e.g., one numeric 4 digit key) as a table entry look-up for an API call, followed by an array containing a known sequence of data elements and known types based on each API call. This approach, in some instances, may trade error capture and recovery for bandwidth efficiency. Further optimization may be achieved by conforming the table look-up to place the more commonly called entries earlier in the table.

In some implementations, efficiency is improved by employing an asynchronous pull of data from the server. WebGL API calls that rely on images can receive the image data as an uncompressed text array, which may be embedded with a JSON command. Some embodiments, however, use a function call (e.g., a JavaScript image.src function call) to asynchronously pull the image data from the server after the command is sent. This has the added advantage of attaching the image data to the DOM and having it available again when needed. Additionally, the image data may be transferred in binary format, which may be compressed, such as but not limited to lossless PNG, lossy JPG images or the like, which often makes it more network efficient.

Some embodiments additionally or alternatively may employ network buffering strategies to improve performance, reduce network bandwidth, reduce latency, reduce processing and/or other such benefits. For example, some embodiments improve network performance by improving buffering such that transmit and receive buffer handlers attempt to ensure that one or both transmit and receive buffer handlers are kept close to full or substantially in a full state whenever asynchronous graphics commands are to be communicated (e.g., streamed), and/or buffering is maintained until a full display screen of graphics is available. Further, synchronous commands, such as but not limited to display updates or commands needing a response, may flush the transmit buffer to reduce or minimize latency.

For example, to enhance the use of buffering the formatting of graphics commands can be modified according to predefined formatting so that at least some asynchronous commands can be distinguished from at least some synchronous commands. As one example, additional brackets and/or curly bracketing can be used, one or more objects can be wrapped inside one or more arrays or objects, and/or one or more arrays can be wrapped in one or more objects or arrays. This wrapping complies with, for example, the JSON protocol. As an example, an object within curly brackets can be wrapped within another set of curly brackets providing an object within an object. The predefined formatting can readily be detected and identified (e.g., a RUI client 332 can detect the predefined modified formatting). Accordingly, appropriate action can be taken based on the detected formatting, and in many instances without having to perform processing and/or decoding, or performing limited processing and/or limited decoding of the command, and when appropriate immediate action can be taken.

Similarly, some embodiments can additionally or alternatively provide further JSON protocol optimization by removing object and/or name keys and to send commands and/or parameters as data arrays. Calls to the WebGL API can be done by wrapping the parameters as a JSON formatted object, where these calls can be buffered and generally not executed immediately on the client. For example, a call may comprise:

{'id':1234, 't':−132983, 'ia': [12214, 2345453, 23452-35] }, where the "id" is a key or identifier, which in some instances may be mandatory; the "1234" is an enumerated call ID, which in some instances can be used with the look-up table for an API call; the "t" and "ia" can be secondary keys, with the "[12214, 2345453, 2345235]" defining a data array. Further, some synchronous commands, such as some commands that need immediate action, can be formatted such that the JSON object is wrapped into a JSON array, such as:

[{'id':1234, 't':−132983, 'ia':[12214, 2345453, 23452-35]}].

Similarly, a client buffer can be executed when an immediate call (e.g., a finish( ) call) is received. Accordingly, in some implementations, the client assembles the JSON objects into an array and parses the array into a sequence of WebGL calls, such as:

[{'id':1234 . . . }, {'id':1324 . . . }, {'id':14-23 . . . }, . . . {'id':1435 . . . }].

When DOM objects are created an ID is returned to the server to access that object. This can include creating images, canvases, textures, buffers, frame buffers, programs, shaders and the like.

In some embodiments, further formatting is performed to remove all but the first key. Additionally, the parameters may be placed in an array in a predefined and specific order. For example, an object with the following format:

{'id':1234, 't':−132983, 'ia':[12214, 2345453, 23452-35]}, can be formatted as follows:

{"id", [1234, −132983, [12214, 2345453, 2345235] ] }.

Further, in some instances when commands cannot be buffered (e.g., when immediate action commands cannot be buffered because they require a synchronous response) into the array, formatting can combine the commands, such as follows:

{"id", [1234, −132983, [12214, 2345453, 2345235], 1234, −132983, [12214, 2345453, 2345235], 1234, −132983, [12214, 2345453, 2345235]]}.

This can offer large efficiency gains in the network and amount of JSON parsing that is to be done. The above example provides a reduction from 153 characters to 119 characters.

Additionally, some embodiments improve performance through the control of rendering and/or refreshing of a display screen at the client device as described above. Generally, the WebGL specification provides that browsers are to update the display screen in response to certain calls, such as drawElements( ), drawArrays( ), clear( ), finish( ) and flush( ) calls. The present embodiments, however, can provide an event driven solution that can in some implementations allow for messages from the server to be received at the client device in real time (e.g., communicated to an RUI client as the graphics commands are generated and formatted when appropriate and used at the client device as the graphics commands are received in accordance with processing and buffering as described above and below). It has been identified, however, that allowing such screen updating events to occur may also cause the display at the client device to refresh in response to one or more of these event calls. Further, JavaScript environments are generally single tasking environments. Accordingly, when JavaScript has completed a task it often releases control to allow the system implementing the JavaScript to continue, which can include allowing the browser to refresh the display.

This can cause screen flashing and/or can result in very slow frame draws (e.g., frame rates of one or two frame per second or slower in some instances), particularly when the number of draw elements increases, where in some instances there may be hundreds of draw elements in a frame. Alternatively, the GWTQuake does not experience this problem because the JavaScript client is generally not event driven and a release to the HTML compositor typically occurs at the end of a frame. Accordingly, some present embodiments, in attempts to achieve a similar effect, avoid or prevent the refresh until desired, such as when graphics are available to generate a full screen of graphics, at the end of a frame or the like. For example, some embodiments buffer non-immediate calls (e.g., graphics command calls, graphics information, WebGL calls, and the like) and implement the rendering of the buffered calls when an update call, such as a finish or flush, has been received. Additionally or alternatively, the web browser at the client device can be configured to limit refreshing, such as refreshing upon receiving specific commands, only refreshing on an flush and/or finish call, flushing upon buffering a full or complete display screen of graphics content, or other such triggers, which in some instances may be implemented similar to Enterprise Generation Language (EGL), such as an eglSwapBuffers( ) call.

Further, as introduced above, the formatting of the commands can further allow for distinguishing at the RUI client between synchronous and asynchronous commands, and/or synchronous commands that need a response but do not necessarily involve a screen refresh. Accordingly, some embodiments provide sophistication in the buffering so that the protocol does not simply keep buffering and ignore commands that instruct processing, such as synchronous commands, and the protocol can implement processing of commands expected to need some action to evaluate these commands to determine whether further processing is to take place in response to a command or whether buffering is to continue. For example, a synchronous command may not be a render command, but a request for information, such as information about a previous frame rendered (e.g., requesting information about what was previously displayed in a defined location or region of the display screen, which might be requested by the server so the server can identify how to move a displayed object on the screen). Upon detection of these commands that need action, the buffering process can be interrupted without inducing a rendering or refresh, the command can be processed and/or action taken, and then the buffering of asynchronous commands can continue.

Furthermore, optimization is provided in at least some embodiments through the reduction in redundant processing. For example, some embodiments avoid double testing of numbers by defining numbers as double floating point numbers. One of the differences between a Java and a JavaScript environment is types. For instance, in JavaScript numbers are double precision floating point types. When GWT compiles Java into JavaScript, it typically generates code to check that numeric data types lie within the intended range of the original java application. With WebGL, however, this checking typically is done on the client below the JavaScript API layer and is thus unnecessary. Accordingly, some embodiments changing the GWT WebGL API to treat at least some if not all numbers as double floating point numbers, which provides improved performance. For example, some embodiments modify GWT WebGL and GWT JSON to replace client side "casts" to Integers and Floats to "casts" to double floating point (native JavaScript format), which can remove large amounts of redundant number and/or math checking in JavaScript.

Additionally, some embodiments utilize a load balancing in attempts to improve performance. It has been identified that some embodiments, at least compared with the GWTQuake, trade network load and latency conditions on the network and/or at the server with memory usage at the client device. Accordingly, some embodiments configure the server and/or server protocol application to monitor client conditions and/or network conditions, and apply balancing between the memory usage and the network load and latency conditions.

Still further, some embodiments provide improved performance by providing a native RUI client 332 on the client device, such as in firmware of the client device or otherwise residing on the client device already natively compiled. Accordingly, improved performance can be achieved with such devices having a native RUI protocol client application, which may provide market advantage for such devices (e.g., client devices manufactured with the ability to interact with certain server devices, and/or client devices and server devices manufactured by the same company, such as both a client device and server being manufactured by as Sony®). The RUI client 332 may still be delivered to client devices that do not have a native RUI client application. For example, the server may still deliver the RUI client 332 over the distributed network to client devices.

Figure 5:
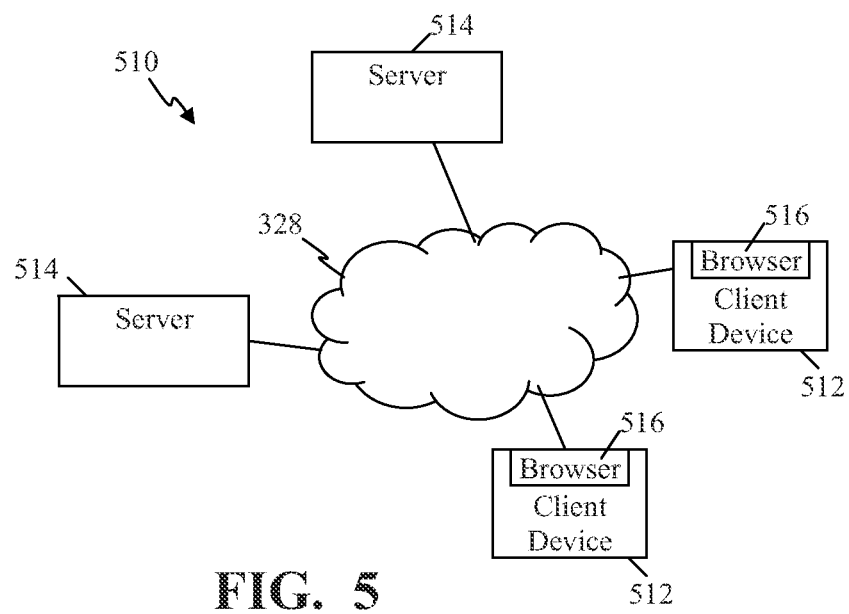
FIG. 5 depicts a simplified block diagram of a system configured to provide a network protocol approach to streaming a graphical RUI according to some embodiments.

FIG. 5 depicts a simplified block diagram of a system 510 configured to provide a network protocol approach to streaming a graphical RUI according to some embodiments. The system includes one or more client devices 512 and one or more servers 514. In some implementations a server 514 can establish one or more communication connections across the distributed network 328 providing communication channels or links between the server and one or more a client devices 512. Further, a server 514 may further be configured, in some embodiments, to simultaneously establish multiple persistent connections with multiple different client devices 512. The client devices 512 can be substantially any relevant consumer electronic (CE) device that can implement a simplified network browser 516 and the RUI client within a browser environment established by the network browser 516. Typically, as described above, the browser is a simplified, stripped down browser that occupies less memory and reduces the CPU processing needs of the web browser compared to other typical browsers implemented on laptops or desktop computers and uses less memory than such typical browsers. Further, the client device 512 can be a device with limited memory and/or CPU processing capabilities, while typically having relatively good graphics capabilities. For example, the client device 512 can be a network and/or Internet Protocol (IP) enabled TV, an electronic interactive gaming console or device, a portable CE device, touch pad device or other similar device on which the simplified browser and RUI client can be implemented.

The server 514 couples with and communicates with one or more client devices 512 over the network 328 to communicating the graphics commands and/or information. Again, in some embodiments, the server 514 streams the graphics commands and/or information to the client device 512. Further, the server may be configured to distribute the RUI client 332 to the client device 512. The server 514 can be implemented through substantially any relevant device on which the server graphics protocol stack 312 can be configured to include the protocol adaptor 324 and the protocol server client 326. For example, the server can be a computer, an electronic interactive gaming device, a portable device, touch pad device (e.g., an iPad®), an Internet server, and/or other such devices. Further, in some implementations the server 514 can be implemented through one or more devices that operate independently or collectively.

The network 328 is a distributed network where the one or more client devices 512 and the one or more servers 514 are distributed over the network 328, and in some instances may be remote from each other. For example, the network 328 can be a wide area network (WAN), a LAN, the Internet, or other such relevant network over which the persistent connection can be established between the server 514 and client device 512. Additionally, in some instances the client device 512 and/or server 514 may access other distributed networks. For example, the client device 512 and server 514 may communicate with each other over a LAN while also being capable of connecting over a WAN (e.g., the Internet) to access other resources and/or services. The communication over the network 328 or the additional network can be over wired communication, wireless communication, fiber optic, other such communication methods, or combinations of such communication methods.

Figure 6:
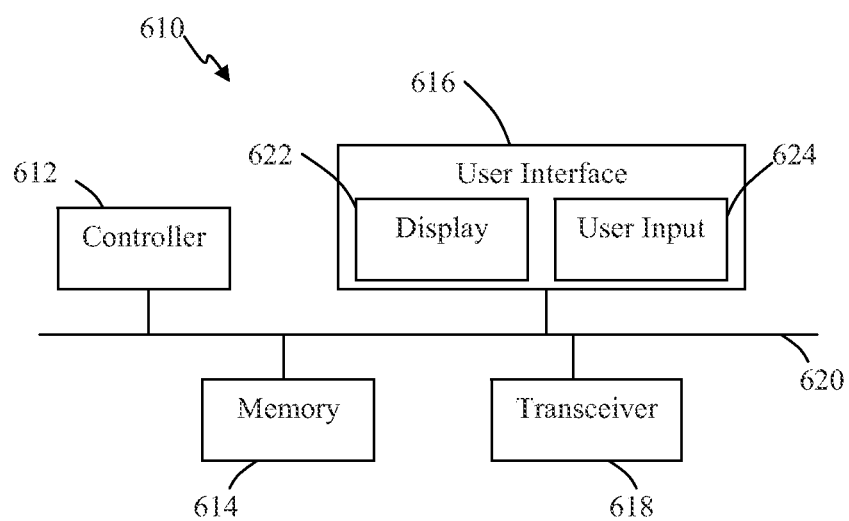
FIG. 6 depicts a simplified block diagram of a system, in accordance with some embodiments, for use in implementing methods, techniques, devices, services, servers, sources, systems and the like in distributing and playing back multimedia content in accordance with some embodiments.

The methods, techniques, devices, services, servers, sources, systems and the like described herein may be utilized, implemented and/or run on many different types of devices and/or systems. Referring to FIG. 6, there is illustrated a system 610 that may be used for any such implementations, in accordance with some embodiments. One or more components of the system 610 may be used for implementing any system, apparatus, device or server mentioned above or below, such as for example any of the above or below mentioned client devices 512, servers 514, and the like. However, the use of the system 610 or any portion thereof is certainly not required.

By way of example, the system 610 may comprise a controller or processor module 612, memory 614, a user interface 616, and one or more communication links, paths, buses or the like 620. A power source or supply (not shown) is included or coupled with the system. The controller 612 can be implemented through one or more processors, microprocessors, central processing unit, logic, local digital storage, firmware and/or other control hardware and/or software, and may be used to execute or assist in executing the steps of the methods and techniques described herein, and control various communications, applications, programs, content, API's, protocols, listings, services, interfaces, etc. The user interface 616 can allow a user to interact with the system 610 and receive information through the system. In some instances, the user interface 616 includes a display 622 and/or one or more user inputs 624, such as a remote control, keyboard, mouse, track ball, game controller, buttons, touch screen, etc., which can be part of or wired or wirelessly coupled with the system 610.

The system 610 further includes one or more communication interfaces, ports, transceivers 618 and the like allowing the system 610 to communication over the distributed network 328, other networks or communication channels with other devices and/or other such communications. Further the transceiver 618 can be configured for wired, wireless, optical, fiber optical cable or other such communication configurations or combinations of such communications.

The system 610 comprises an example of a control and/or processor-based system with the controller 612. Again, the controller 612 can be implemented through one or more processors, controllers, central processing units, logic, software and the like. Further, in some implementations the controller 612 may provide multiprocessor functionality. The memory 614, which can be accessed by the controller 612, typically includes one or more processor readable and/or computer readable media accessed by at least the controller 612, and can include volatile and/or nonvolatile media, such as RAM, ROM, EEPROM, flash memory and/or other memory technology. Further, the memory 614 is shown as internal to the system 610; however, the memory 614 can be internal, external or a combination of internal and external memory. Similarly, the memory 614 and/or part of the memory 614 can be internal to the controller 612 and/or a processor implementing some or all of the controller. The external memory can be substantially any relevant memory such as, but not limited to, one or more of flash memory secure digital (SD) card, universal serial bus (USB) stick or drive, other memory cards, hard drive and other such memory or combinations of such memory. The memory 614 can store code, software, executables, API's, libraries, adaptors, scripts, data, content, multimedia content, programming, programs, media stream, media files, textual content, identifiers, log or history data, tables, user information and the like. In some embodiments, the memory 614 stores software that implements the server graphics protocol stack 312 and/or the client graphics protocol stack 314.

One or more of the embodiments, methods, processes, approaches, and/or techniques described above or below may be implemented in one or more computer programs executable by a processor-based system. By way of example, such a processor based system may comprise the processor based system 610, a computer, IP enabled television, IP enabled Blu-ray player, portable smart phone, entertainment system, interactive gaming console, graphics workstation, tablet, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques to enable an RUI on a client device 512, and/or a server 514 that formats and distributes graphics commands and/or information to be remotely displayed through the remote RUI client on a client device 512. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a non-transitory medium for embodying a computer program for input to a processor or computer and a computer program embodied on the medium for causing the processor or computer to perform or execute steps comprising any one or more of the steps involved in any one or more of the embodiments, methods, processes, approaches, and/or techniques described herein. For example, some embodiments provide one or more non-transitory computer-readable storage mediums storing one or more computer programs for use with a computer simulation, the one or more computer programs adapted to cause a computer and/or processor based system to execute steps comprising: implementing, on a multimedia rendering client device coupled with a distributed local area network (LAN), a simplified Internet browser, where the browser establishes a browser environment; establishing a persistent network connection (e.g., persistent full-duplex communications channel over a single Transmission Control Protocol (TCP) socket) over the distributed LAN between the client device and a remote server on the LAN; operating, within the browser environment and on the client device, a lightweight remote user interface (RUI) protocol client application that is operated with a JavaScript based graphics application program interface to the graphics protocol stack of the client device; receiving, through the RUI client application and from the server over the LAN, graphics commands; implementing, through the RUI client application in cooperation with the JavaScript based graphics application program interface, the graphics commands and generating graphics in accordance with the graphics commands; and displaying on the client device the graphics consistent with the graphics commands.

Other embodiments provide one or more computer-readable storage mediums storing one or more computer programs for use with a computer simulation, the one or more computer programs adapted to cause a computer and/or processor based system to execute steps comprising: establishing, through a server, a bidirectional persistent Transmission Control Protocol (TCP) network connection over a distributed local area network (LAN) between the server and a remote client device coupled with the LAN; initiating local processing of multimedia content at the server, where the initiating the local processing comprises generating graphics commands intended to be utilized locally at the server to generate graphics intended to be locally displayed; implementing a protocol adaptor inserted within a protocol stack of the server at a graphics driver level of the protocol stack; intercepting, within the protocol adaptor, the graphics commands; and communicating the intercepted graphics commands over the persistent network connection to the client device on the LAN.

Still other embodiments provide one or more computer-readable storage mediums storing one or more computer programs for use with a computer simulation, the one or more computer programs adapted to cause a computer and/or processor based system to execute steps comprising: converting content configured in a non-JavaScript format to a JavaScript format; formatting function calls within the JavaScript formatted content to a text based formatting, providing formatted content; establishing a persistent communication link over a local area network with a remote device functioning as a remote user interface (RUI) device; and streaming the formatted content over the persistent communication link to the RUI device to be played back by the RUI device through a simplified web browser application operating on the RUI device.

The performance achieved through some embodiments enables the playback of content at a remote RUI client device 512 with graphics commands and/or information streamed to the remote client device 512 from the server 514. As a comparison, the performance in the remote displaying of graphics according to some present embodiments (referred to generally below as XNGQuake) in displaying a particular graphics application (i.e., Jake2) were compared with the playback of GWTQuake on a playback device and the playback of Jake2 through an OpenGL Extension to the X Window System (GLX).

For example, the parameters of interest that were considered comprise frames-per-second (FPS), memory usage, network bandwidth, and processor or CPU usage. For measuring FPS a consistent spin test feature of Quake was used. The other parameters were measured as dynamic averages during play using standard Ubuntu System reporting tools. Further, a slower personal computer (PC) was used in some implementations to emulate client hardware to replicate more closely performance of an embedded CE device having limited processor and/or memory capabilities, and a 100 MiB router was used to simulate typical LAN configurations, such as a home LAN. The set up included the following: 1) Hardware included: CPU/Memory: Pentium 4 HT 640/RAM: 2 MiB; GFX: ATI Radeon HD 2400 XT; and Network: 100 MiB with router; screen size setting: 640× 480; and 2) Software included: OS: Linux Ubuntu 9.10 (32 bits); GLX version: 1.4; and a Chrome browser nightly build 4.0.262.5.

Figure 7:
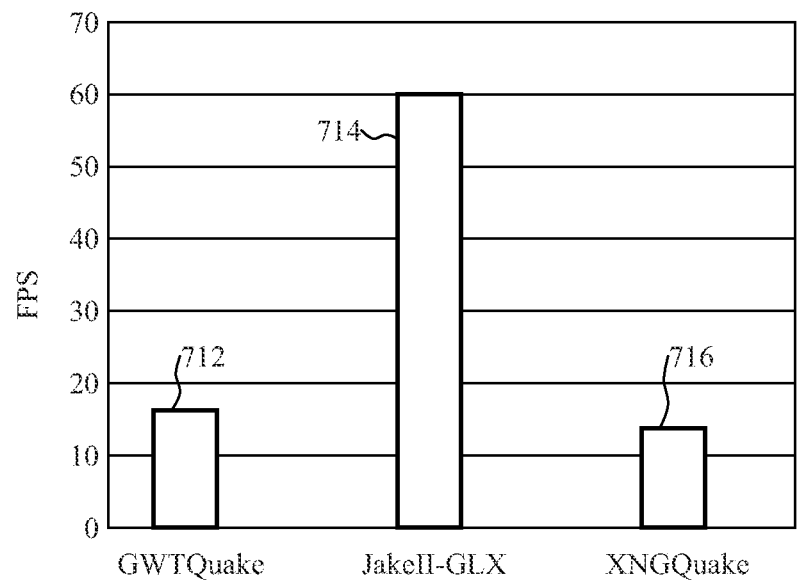
FIG. 7 shows a graphical representation of a comparison of frames-per-second performance according to some embodiments.

FIG. 7 shows a graphical representation of a comparison of frames-per-second performance for each of the GWTQuake 712, the Jake II using GLX 714, and the XNGQuake 716 according to some embodiments. The FPS measured for XNGQuake performance, as expected, was not as good as the optimal JakeII over GLX but yet delivers a quite playable version of the game at about 14 FPS or more. Despite the extra networking support and JSON protocol, XNGQuake does well compared to the GWTQuake local client. When XNGQuake is served under the same conditions to a higher performance Safari browser on a MacBook Pro the performance leapt to about 45 FPS or more showing that at least some of the limitation in performance relates to the client CPU and not the network or server. It is noted that a significant amount of client CPU time with the XNGQuake is spent parsing the JSON messages from the WebSocket into WebGL commands, with a relatively small percentage for processing the rendering operation.

Figure 8:
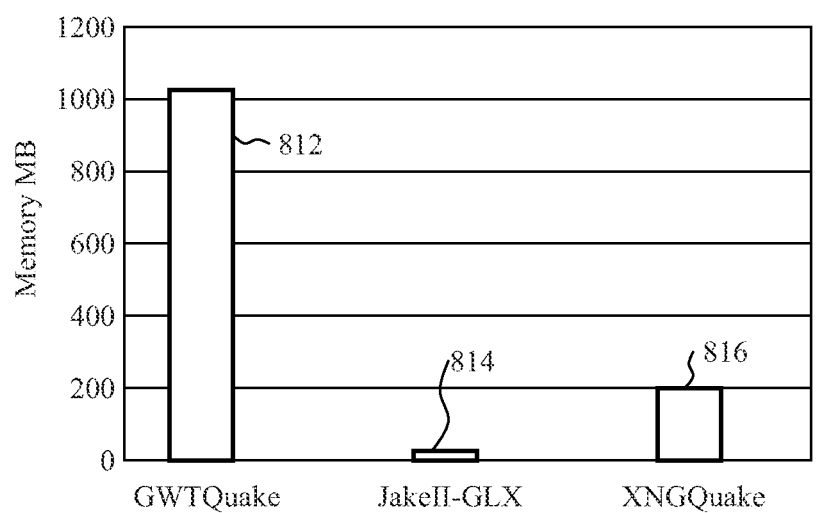
FIG. 8 shows a graphical representation of a comparison of memory usage (in MB) according to some embodiments.

FIG. 8 shows a graphical representation of a comparison of memory usage (in MB) for each of the GWTQuake 812, the Jake II using GLX 814, and the XNGQuake 816 according to some embodiments. In some implementations, the XNGQuake uses less than half, and in some instances as little as one fifth of the memory usage 816 on the client device 512 for code and data compared to GWTQuake 812. Thus, in CE devices having limited memory resources the XNGQuake can provide a desirable playback experience. The memory use by the JakeII with GLX 814 utilizes a relatively small amount of memory at the displaying device because of the X Windows System implementation with substantially all if not all data being discarded after it is stored in graphics hardware memory.

Figure 9:
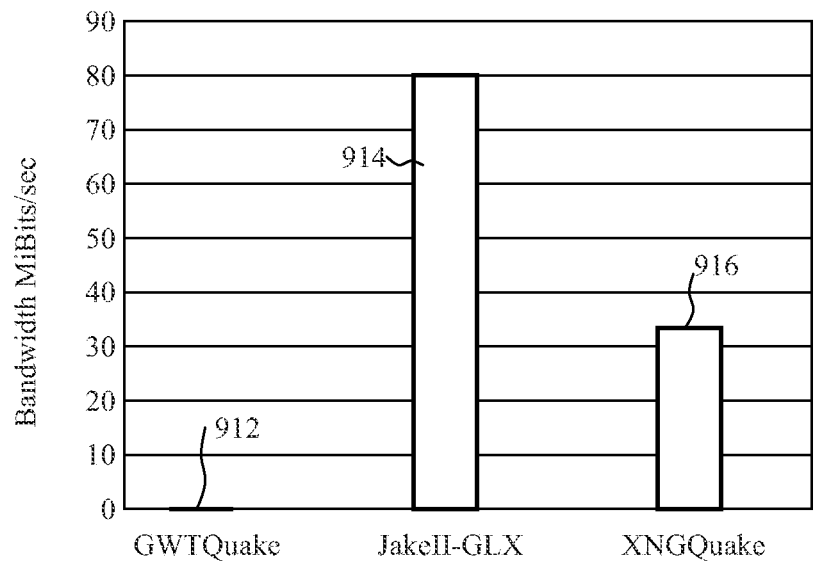
FIG. 9 shows a graphical representation of a comparison of network bandwidth usage (in Mbits/sec) according to some embodiments.

FIG. 9 shows a graphical representation of a comparison of network bandwidth (in Mbits/sec) for each of the GWTQuake 912, the Jake II using GLX 914, and the XNGQuake 916 according to some embodiments. With JakeII over GLX the limiting factor is the network bandwidth with bandwidth being almost three times that of the XNGQuake. In LAN networks, such as in home LAN networks, this bandwidth usage would draw very heavily on other network devices and/or users. In contrast, XNGQuake pulls a much more modest load, which was similar to a High Definition (HD) MPEG2 stream, making it quite suitable for home LAN networking. Because of the local operation the GWTQuake uses minimal bandwidth.

Figure 10:
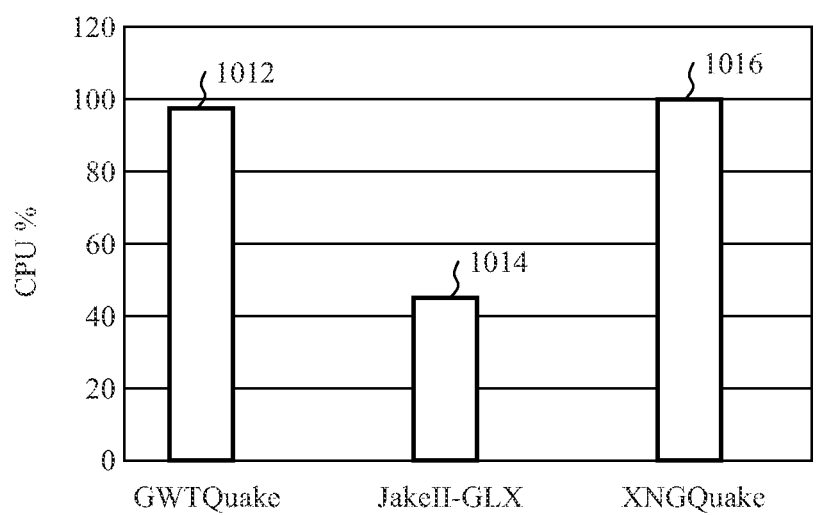
FIG. 10 shows a graphical representation of a comparison of percentage of processor and/or CPU usage according to some embodiments.

FIG. 10 shows a graphical representation of a comparison of percentage of processor and/or CPU usage for each of the GWTQuake 1012, the Jake II using GLX 1014, and the XNGQuake 1016 according to some embodiments. The CPU usage for the XNGQuake 1016 was about equal that of the GWTQuake 1012. FIG. 10 further demonstrates the throttling back of the client CPU with JakeII over GLX 1014 due to the restricted network bandwidth.

Accordingly, from these measurements, it can be seen that the XNGQuake effectively provides a RUI client on a client device 512 with limited functionality and/or memory. It is further identified that improvements for the XNGQuake may be achieved with the use of binary WebSocket which should free CPU load allowing higher frame rates, and/or with further optimization.

Further, the XNGQuake and other present embodiments can extend the implementation and/or capabilities of WebGL, such as but not limited to providing a home networking solution for RUI that emulates GLX functionality yet runs in a browser environment. Accordingly, at least some present embodiments can adapt at least some OpenGL ES based applications on a server (whether implemented through a relatively fixed device or mobile device) to be served remotely to a browser based client device (e.g., browser enabled TV) and that can further support accelerated 3D graphics. In some embodiments, the server may still allow for the utilization of the same user input mechanism at the server (e.g., like a touch pad, mouse, keyboard, touch screen, and the like), with graphics being delivered remotely to the RUI client. With the evolution of slate and tablet devices that support advanced graphics the market potential for this type of RUI client provided by the present embodiments is growing and could be significant.

It was further identified, when comparing the present XNGQuake and the GWTQuake, that a trade results between load and latency requirements on the network/server with memory footprint on the client. An RUI server, in some present embodiments, can be configured to detect the network and client conditions and use this information to intelligently provide improved or a more optimal solution by load balancing between the two extreme cases.

Another trade off identified is that in order to remain compatible with existing browsers XNGQuake, in some instances, may sacrifice performance as compared against a GLX approach. Some embodiments, however, may provide the protocol RUI client natively on the client devices, which can recapture some of that performance sacrifice. For instance, a game server (e.g., a PlayStation® gaming device) may be configured to deliver an RUI client in a browser compatible way by downloading the RUI client (e.g., an XNG protocol application). But when connected to a compatible client device (e.g., a Sony Television) where the RUI protocol client application is natively complied on the client device the performance may be better and in some instances dramatically better, adding value to customers, including customers who prefer the compatible CE devices (e.g., customers that prefer Sony based home ecosystem). The present embodiments demonstrate how the traditionally separated roles of the WAN and the LAN environments can be broken down, and provide additional services and features while opening new markets.

Again, the present embodiments provide methods, systems and technology in establishing and providing RUI architectures. Further, these embodiments provide favorable benefits such as but not limited to: overcoming limitations from language differences; overcoming client memory storage limitations; overcoming CPU limitations by balancing the load onto a server; removing the risk of damaging application piracy; and other such benefits. Some embodiments may further provide additional benefits, including benefits from open web standards such as but not limited to: competitive open source and proprietary implementations available; large documentation support from the W3C; large community of web developer; services from the cloud; having wide and ever increasing deployment basis, like Sony Google TV; and the like. These and other benefits are provided while still enabling very dynamic and high quality user interfaces with few trade-offs.

Additionally, some embodiments incorporate a protocol adaptor or adaptor layer application at the graphics driver level that takes the graphics commands, and instead of sending them to a local display screen at the server (e.g., an iPad screen), it sends it over a distributed home network to a consumer electronic device, such as a TV. The graphics commands and/or data can be generated from substantially any graphics application 316. For example, the graphics application can be an interactive electronic game operated on a server 514. Without changes to the game, and typically without knowing how that game is coded or written, some embodiments with the insertion of the protocol adaptor 324 take the graphics commands and data generated from that game and deliver the graphics commands and data to the RUI client being implemented on a client device 512. Further, the protocol adaptor can establish a persistent connection over the distributed network 328 with the RUI client. For example, the adaptor layer can comprise the protocol server client 326 that provides the functionality to establish the persistent connection.

Furthermore, some embodiments take advantage of available technologies, such as those available in advanced graphics cards (e.g., OpenGL). Further, JavaScript and WebGL can be used as interfaces to the OpenGL, such that OpenGL becomes compatible with web browsers. Accordingly, some embodiments provide a browser environment within which the RUI client can use the OpenGL 3D acceleration that is accessible through the JavaScript, and therefore, over a distributed network. Other devices with more complex processing and/or larger available memory can download more complex applications and/or plug-ins that generally require relatively large amounts of memory.

Many CE devices, however, do not have the resources to download and implement these relatively large applications and/or plug-ins. Similarly, many of these applications or plug-ins require the cooperation of more complex and larger web browsers. Again, many CE devices cannot effectively implement such complex browser applications. Alternatively, the present embodiments provide a lightweight RUI client that operates on the CE device within a browser environment established by a stripped down and simplified browser that can be readily implemented on such limited CE devices in providing a remote user interface that can remotely display graphics generated at a remote server.

Again, the RUI client can be a protocol client that operated on top of the WebGL and utilizes WebSockets in establishing a live and persistent network connection between a server 514 and client device 512. The server 514 can then stream graphics commands to the RUI client, where the RUI client translates those commands from a streaming format to a format that is compatible with and can be sent down into the WebGL, which can allow the client device 512 to display graphics accelerated on the client device. As such, some embodiments emulate an X Windows System, but instead utilize browser technologies while using JavaScript and WebGL.

The some embodiments provide the ability to communicate or pipe visual graphics content compatible with an Internet web browser being operated on remote display devices. As such, a remote user interface (RUI) is provided through the use of a web browser, and typically a stripped down, simplified browser that utilizes limited resource of the display device.

Further, some embodiments allow commands to be received through the client device 512 that can be forwarded to the server 514 in controlling the graphics application 316. In some instances, the client device receives the commands (e.g., through a user input device, such as but not limited to, a remote control, a key board, a mouse, or other such input device), where the commands are to be implemented at the server. The RUI client in turn captures the commands, packages the commands and communicates them to the server leveraging the low latency provided by the persistent bidirectional connection over the distributed network 328. This provides the relatively quick response time that may be needed for some implementations and/or graphics applications 316, such as interactive game, where the commands are intended to control the playback of the game. For example, the server 514 can be a gaming console located on a distributed network (e.g., PlayStation®, X-box®, Wii®, etc.) that forwards graphics commands and/or data over the distributed network to an RUI client at a remote client device 512 to be displayed on the remote client device (e.g., TV). The client device 512 can further receive user interaction commands to control portions of the game and communicate those commands to the gaming console. In this configuration the gaming console can be located substantially anywhere on the distributed network 328 and does not have to be near the client device 512.

Additionally, some embodiments activate a command protocol at the client device 512. User interactive commands can be received and processed through the command protocol. For example, the command protocol can package one or more user interactive commands, and initiate communication of the packaged one or more commands via the persistent network connection to the server.

Other embodiments, however, receive user interaction commands at the server 514. For example, the server 514 may be a laptop computer, tablet personal computer, or other device where user interactions are received at the server (e.g., through a touch screen on a tablet PC) while the graphics are communicated to the RUI client and displayed on the client device 512. This configuration can further simplify the RUI client as commands do not have to be processed or communicated back to the server, which may also enhance the low latency with substantially all of the communication being in one direction (e.g., less than 20% and in some instances less than 10% of communications being communicated from the client device to the server).

While the invention herein disclosed has been described by means of specific embodiments, examples and applications thereof, numerous modifications and variations could be made thereto by those skilled in the art without departing from the scope of the invention set forth in the claims.

What is claimed is:

1. A method of playing back multimedia content, the method comprising:
    implementing, on a multimedia rendering client device an Internet browser for establishing a browser environment,
    establishing a network connection between the client device and a remote server;
    operating, within the browser environment on the client device, a remote user interface (RUI) protocol client application operated with a JavaScript based graphics application program interface to a graphics protocol stack of the client device;
    receiving, through the RUI protocol client application and from the server over the network, graphics commands;
    implementing, through the RUI protocol client application in cooperation with the JavaScript based graphics application program interface, the graphics commands and generating graphics in accordance with the graphics commands; and
    displaying on the client device the graphics consistent with the graphics commands.

2. The method of claim 1, wherein the browser comprises a HTML5 browser compatible with at least one of WebGL, Web Sockets and JavaScript technologies.

3. The method of claim 2, wherein the HTML5 browser is configured to use declarative (XML) graphical methods.

4. The method of claim 2, wherein the HTML5 browser includes library support for Canvas 2D and WebGL APIs.

5. The method of claim 1, wherein establishing the network connection comprises establishing persistent full-duplex communications channel over a single Transmission Control Protocol (TCP) socket between the client device and the remote server.

6. The method of claim 1, wherein receiving the graphics commands comprises receiving streamed graphics commands streamed over a persistent full-duplex communications channel; and
    wherein the implementing the graphics commands comprises translating, through the RUI protocol client application, the streamed graphics commands from a streaming format to a JavaScript based graphics application program interface compatible format.

7. The method of claim 6, wherein translating the streamed graphics commands comprises translating the streamed graphics commands from the streaming format to a text based formatted protocol based on the JavaScript based graphics application program interface compatible format.

8. The method of claim 1, further comprising:
    preventing a refresh of a display screen of the client device until graphics are available to generate a full screen of graphics.

9. The method of claim 8, further comprising: distinguishing, at the RUI protocol client application, between synchronous and
    asynchronous commands; and
    buffering asynchronous commands until a full display screen is available.

10. The method of claim 1, further comprising:
    activating a command protocol at the client device;
    processing, through the command protocol, one or more control commands and packaging the one or more commands; and
    communicating the packaged one or more commands via the network connection to the server, where the control of the playback of the multimedia content is implemented at the remote server.

11. A device for playing back multimedia content, the device comprising one or more processors configured for:
    implementing, on the device an Internet browser for establishing a browser environment;
    establishing a network connection between the client device and a remote server;
    operating, within the browser environment, a remote user interface (RUI) protocol client application operated with a JavaScript based graphics application program interface to a graphics protocol stack of the device;
    receiving, through the RUI protocol client application and from the server over the network, graphics commands;
    implementing, through the RUI protocol client application in cooperation with the JavaScript based graphics application program interface, the graphics commands and generating graphics in accordance with the graphics commands; and
    displaying on the client device the graphics consistent with the graphics commands.

12. The device of claim 11, wherein the browser comprises a HTML5 browser compatible with at least one of WebGL, Web Sockets and JavaScript technologies.

13. The device of claim 12, wherein the HTML5 browser is configured to use declarative (XML) graphical methods.

14. The device of claim 12, wherein the HTML5 browser includes library support for Canvas 2D and WebGL APIs.

15. The device of claim 11, wherein the one or more processors are configured to establish the network connection by establishing persistent full-duplex communications channel over a single Transmission Control Protocol (TCP) socket between the client device and the remote server.

16. The device of claim 11, wherein the one or more processors are configured to receive streamed graphics commands streamed over a persistent full-duplex communications channel; and
    implement the graphics commands by translating, through the RUI protocol client application, the streamed graphics commands from a streaming format to a JavaScript based graphics application program interface compatible format.

17. The device of claim 16, wherein the one or more processors are configured to translate the streamed graphics commands from the streaming format to a text based formatted protocol based on the JavaScript based graphics application program interface compatible format.

18. The device of claim 11, wherein the one or more processors are configured to generate a refresh of a display screen of the client device until graphics are available to generate a full screen of graphics.

19. The device of claim 11, wherein the one or more processors are configured to:
- activate a command protocol at the client device;
- process, through the command protocol, one or more control commands and packaging the one or more commands; and
- communicate the packaged one or more commands via the network connection to the server, where the control of the playback of the multimedia content is implemented at the remote server.

20. A computer program product comprising a non-transitory medium for embodying a computer program for input to a processor based system and a computer program embodied in the medium for causing the processor based system to:
- implement, on a multimedia rendering client device an Internet browser for establishing a browser environment,
- establish a network connection between the client device and a remote server;
- operate, within the browser environment on the client device, a remote user interface (RUI) protocol client application operated with a JavaScript based graphics application program interface to a graphics protocol stack of the client device;
- receive, through the RUI protocol client application and from the server over the network, graphics commands;
- implement, through the RUI protocol client application in cooperation with the JavaScript based graphics application program interface, the graphics commands and generating graphics in accordance with the graphics commands; and
- display on the client device the graphics consistent with the graphics commands.

\* \* \* \* \*